Figure 1:
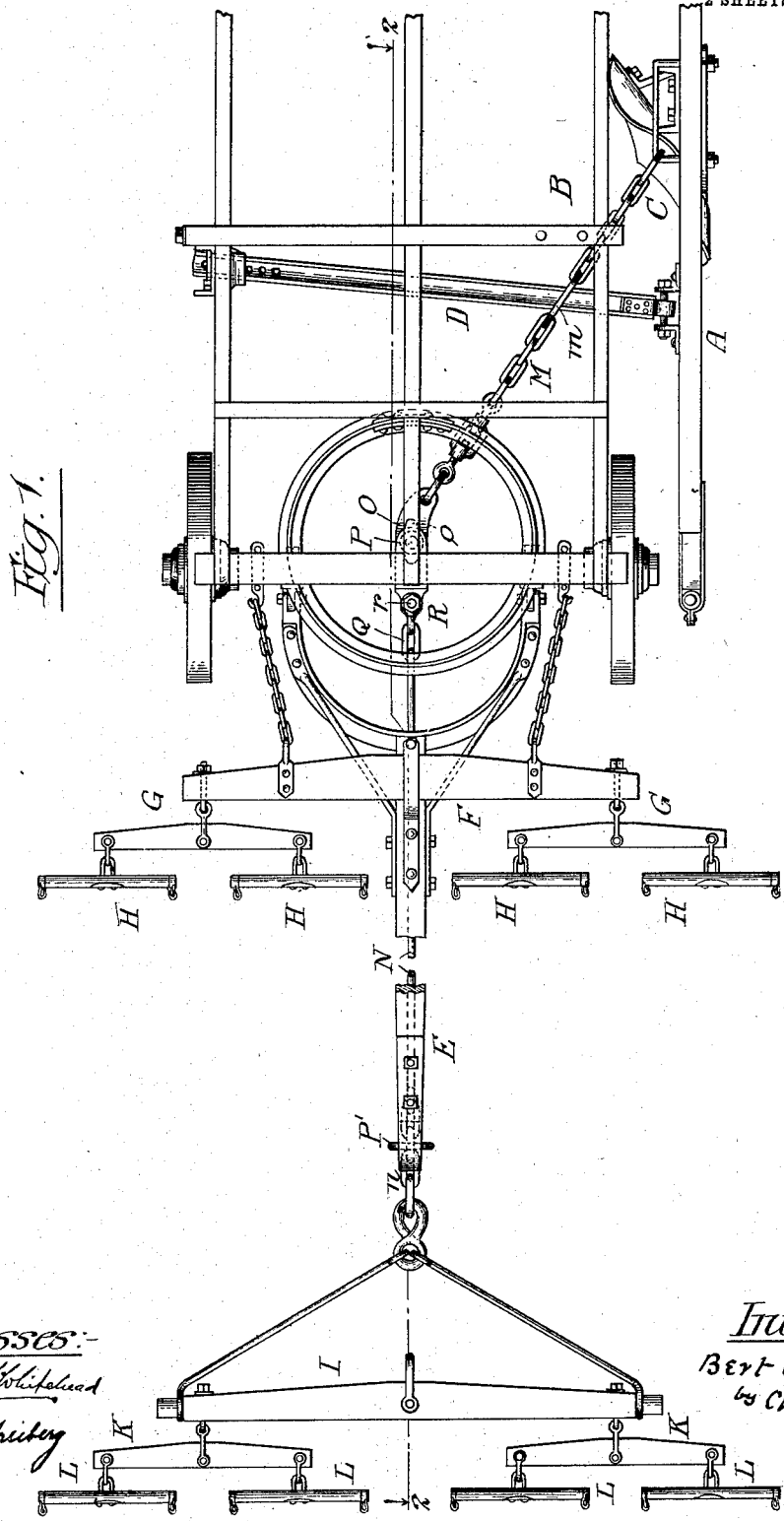

No. 749,748. PATENTED JAN. 19, 1904.
B. O. RHODES.
GRADING AND DITCHING MACHINE.
APPLICATION FILED NOV. 16, 1903.
NO MODEL. 2 SHEETS—SHEET 1.

Witnesses:
Louis M. Whitehead
Ottilie C. Friberg

Inventor:
Bert O. Rhodes
by Chas. G. Page
Atty.

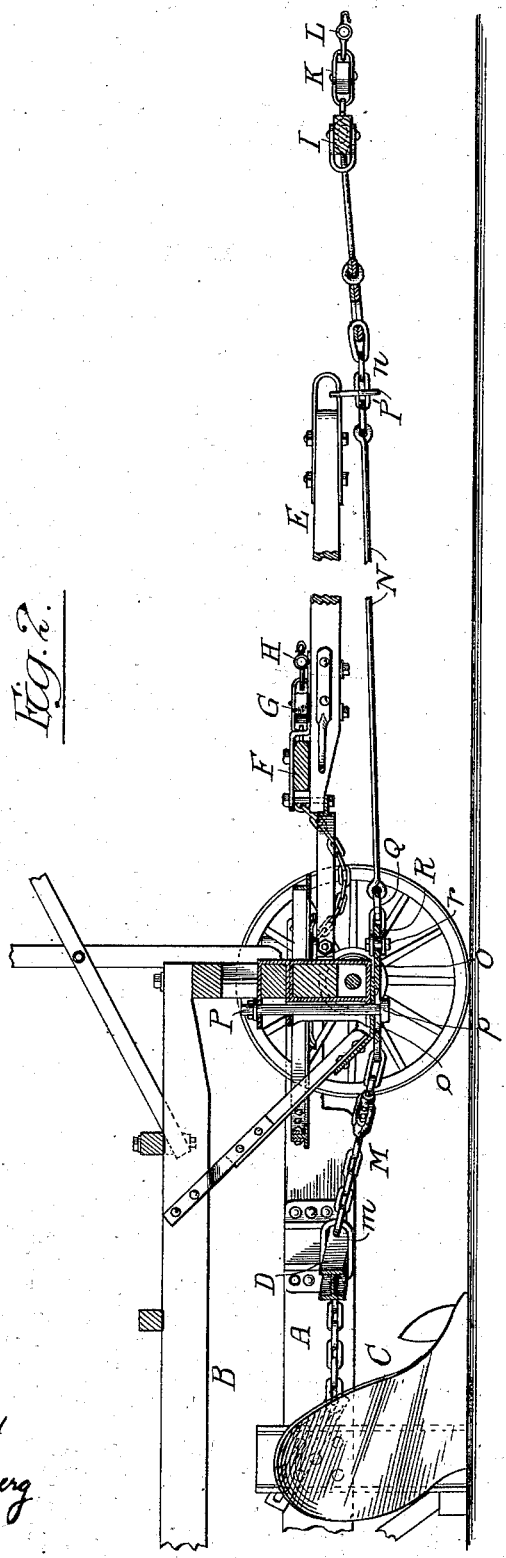

No. 749,748. Patented January 19, 1904.

UNITED STATES PATENT OFFICE.

BERT O. RHODES, OF BARBERTON, OHIO, ASSIGNOR TO NATIONAL DRILL AND MANUFACTURING COMPANY, OF CHICAGO, ILLINOIS, A CORPORATION OF WEST VIRGINIA.

GRADING AND DITCHING MACHINE.

SPECIFICATION forming part of Letters Patent No. 749,748, dated January 19, 1904.

Application filed November 16, 1903. Serial No. 181,360. (No model.)

*To all whom it may concern:*

Be it known that I, BERT O. RHODES, a citizen of the United States, residing at Barberton, in the county of Summit and State of Ohio, have invented a certain new and useful Improvement in Grading and Ditching Machines, of which the following is a specification.

My invention relates to a class of grading and ditching machines in which a carriage or wheeled body-frame is provided with a plow for digging up the soil and an elevating carrier arranged for taking the loose soil from the plow and delivering it at one side of the body-frame, the machine being drawn over the ground by a suitable number of horses.

In the class or type of these grading and ditching machines to which my invention more particularly relates or is more desirably applicable a plow-beam provided with a suitable plow is arranged at one side of the machine and suspended by raising and lowering devices, a good illustration of a machine of such general character being afforded by Letters Patent to Edwards and Durkee, No. 275,614, April 10, 1883.

Prior to my invention the plow has been drawn from some portion of the carriage—as, for example, in patent to W. J. Edwards, No. 393,467, November 27, 1888, the plow is drawn from the front axle or bolster by means of a draft-chain attached at its rear end to a transversely-arranged stay-bar for the plow-beam, in Letters Patent to W. H. Morenus, No. 690,451, the forward end of the draft-chain is attached to the rear end of the tongue or pole, while in a pending and allowed application of Thomas J. Gray, Serial No. 158,258, filed May 22, 1903, the draft-chain has its rear end attached to the plow-beam and its forward end connected with the evener, which is pivoted upon the rear end of the pole and employed for the back team of horses. Owing to the great draft strain upon the portions of the carriage to which the plow has been thus connected, it frequently or occasionally happens that such portions of the carriage become broken.

The object of my invention is to avoid such breakage and to distribute the draft between the carriage and the plow in a novel and improved way.

In the accompanying drawings, Figure 1 is a top plan view of a portion of a grading and ditching machine sufficient to illustrate the application of my invention thereto. Fig. 2 is a section on line 2 2 in Fig. 1.

In the type of machine illustrated the plow-beam A is arranged alongside the carriage or wheeled body-frame B and provided with a suitable plow C. It is also understood that the plow-beam is suspended by a raising and lowering device substantially as in the patents hereinbefore mentioned and that, as illustrated in said patents, the machine is to be provided with an elevating-carrier for taking the plowed-up soil from the plow at one side of the machine and delivering such loose soil at the opposite side of the machine for well-known purposes.

D indicates the forward swinging stay-bar, which is at one end hinged to the plow-beam in advance of the plow and at its opposite end pivoted or hinged to the body-frame of the machine. The body-frame is provided at its forward end with a tongue or pole E and with an evener F, arranged at the rear end of the pole, the evener in this illustration being provided with doubletrees G G, each having a pair of swingletrees H, whereby the body-frame can be drawn by the back team, comprising four horses abreast.

The evener I for the forward team of horses is shown provided with two doubletrees K, having a pair of swingletrees L. The forward evener I is not connected with the pole or with the body-frame, it being connected with the plow by a draft attachment so that during operation the wheeled body-frame or carriage will be drawn by the back team, while the plow will be drawn by the forward team, and hence during heavy work the draft strain produced by back pull on the part of the plow will be on the forward team, while the draft strain incident to drawing the carriage along the ground will be upon the back team.

The draft attachment illustrated comprises a chain M, having its rear end attached to the plow-beam at a point back of the stay-bar D, whereby it is, in effect, connected with the plow. The chain M extends from its point of connection with the plow-beam forwardly and obliquely toward the middle of the front axle, where it is suitably guided, and then extended directly forward to connect with the rear end of a longitudinally-arranged rod N, which has its forward end connected with the evener I for the forward team, it being observed that this rod, broadly considered, is an extension of the chain M and that, if preferred, the rod N could be replaced by a chain arranged as a continuation of the chain M, although I regard the use of the rod N as a matter of further and special improvement. The draft device thus arranged between the forward evener and the plow can be guided at the front axle or bolster by any suitable means—as, for example, the chain M can be provided with a long link or slotted plate O, engaging a guide pin, plate, or bolt upon the front bolster. In the specific arrangement shown this guide stud or pin is formed by the king-bolt P, which extends through the longitudinal slot in the link or plate O, the lower end of the king-bolt being provided with a head p, which is arranged under the plate or link O so as to support the latter. The slot in the plate or link O is of sufficient length to permit a desired extent of longitudinal play on the part of the draft attachment independently of the front axle, and by this arrangement the draft attachment which connects the forward evener with the plow has a limited longitudinally-shifting connection with the middle forward portion of the body-frame by means of the king-bolt, it being obvious that, broadly considered, the draft attachment has a limited longitudinally-shifting connection with the middle forward portion of the body-frame.

The draft-rod N is flexibly connected, as at n, with the forward evener and is conveniently guided at its forward end by a guide-loop P, supported upon the pole, it being observed that the rod N, which forms a portion of the draft attachment, extends longitudinally and under the pole E. The rod N is also flexibly connected with the link or plate O—as, for example, by a link Q, connecting the rod with the clevis R, which is attached to the link or plate O by a vertical pivot r.

I do not herein claim any of the matters described and claimed in the said application of Thomas J. Gray, it being observed, however, that I herein illustrate a feature embodied in said application of Gray and consisting of a long link m, provided in the draft-chain M and arranged so that the stay-bar D can extend through it and at the same time have a desired extent of lateral play independently of the draft-chain or, conversely, permit the draft-chain to have a desired extent of longitudinal movement independently of the stay-bar.

What I claim as my invention is—

1. In a ditching and grading machine, a wheeled body-frame provided with a plow, and an evener for a back team of horses; an evener for a forward team of horses; and a draft attachment arranged as a connection between the plow and the forward evener; the draft strain incident to the use of the plow being upon the forward evener by means of the draft attachment and the resistance of the wheeled body-frame being upon the rear evener.

2. In a grading and ditching machine, a wheeled body-frame provided with a plow and having an evener for a back team of horses; a forwardly-arranged evener for a forward team of horses; and a draft attachment connecting the forward evener with the plow and having a limited shifting connection with the middle forward portion of the body-frame.

3. In a grading and ditching machine, a wheeled body-frame having a plow, and an evener for a back team of horses connected with the body-frame; a forwardly-arranged evener for a forward team of horses; a draft attachment arranged as a connection between the forward evener and the plow and comprising in part a chain and in part a rod, the rod being arranged to extend forwardly from the machine.

4. In a grading and ditching machine, a wheeled body-frame; a suspended plow-beam provided with a plow; a transversely-arranged stay-bar having hinged or pivotal connections with the plow-beam and the body-frame; and a draft attachment comprising a rod extending forwardly from the machine and a chain arranged as a connection between said rod and the plow, said draft attachment being guided and maintained at a point midway of the front wheels.

5. In a ditching and grading machine, a wheeled body-frame provided with a forwardly-extending pole and an evener for a back team of horses; a suspended plow-beam arranged at one side of the machine; a swinging stay-bar having hinged or pivotal connections with the plow-beam of the body-frame; a forwardly-arranged evener for a forward team of horses disconnected from a pole; and a draft attachment connecting the forward evener with the plow and arranged to extend from its rear end obliquely forward to the middle forward portion of the machine and thence directly forward under the pole to the forward evener, said draft attachment having a shifting connection with the middle forward portion of the body-frame.

BERT O. RHODES.

Witnesses:
CHARLES G. PAGE,
OTTILIE C. FREIBERG.